United States Patent [19]
Zeuner

[11] 3,818,927
[45] June 25, 1974

[54] NORMALLY OPEN SOLENOID OPERATED VALVE ASSEMBLY WITH RELIEF FUNCTION

[75] Inventor: Kenneth W. Zeuner, Newtown, Pa.
[73] Assignee: Control Concepts, Inc., Richboro, Pa.
[22] Filed: June 18, 1973
[21] Appl. No.: 370,636

[52] U.S. Cl............................. 137/110, 251/110
[51] Int. Cl............................................. F16k 31/10
[58] Field of Search................... 137/110, 522, 523; 251/129

[56] References Cited
UNITED STATES PATENTS

| | | | |
|---|---|---|---|
| 3,250,293 | 5/1966 | Adams et al.................. | 251/129 X |
| 3,707,992 | 2/1973 | Ellison et al................... | 251/129 X |
| 3,724,485 | 4/1973 | Cox et al. ...................... | 137/110 X |
| 3,729,169 | 4/1973 | MacDuff......................... | 251/129 |
| 3,737,141 | 6/1973 | Zeuner.......................... | 251/129 |

Primary Examiner—William R. Cline
Attorney, Agent, or Firm—Maleson, Kimmelman & Ratner

[57] ABSTRACT

A normally open solenoid operated valve assembly having a poppet movable between a valve normally open position and a position for seating in and closing an orifice. A movable armature has a reduced section for engaging the poppet. A range spring tending to bias the poppet to the valve closed position while a bias spring tends to bias the armature to engage and move the poppet to the valve open position. Since the bias spring has a greater spring force than the range spring, the poppet is normally maintained in the valve open position. To close the valve, a solenoid is energized to move the armature in a direction allowing the range spring to bias the poppet closed. When closed, the valve assembly provides a relief function if upstream pressure becomes greater than a predetermined value which may be adjusted by varying the spring force of the range spring.

9 Claims, 5 Drawing Figures

PATENTED JUN 25 1974 3,818,927
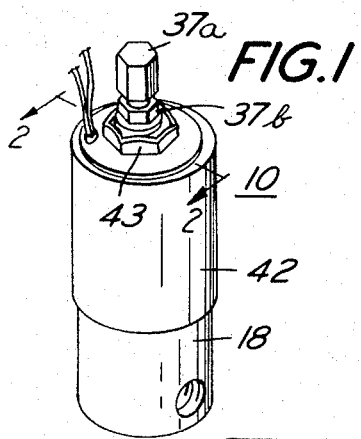
FIG.1
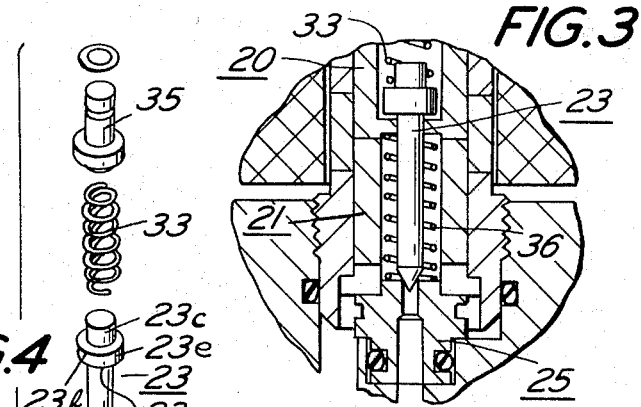
FIG.3
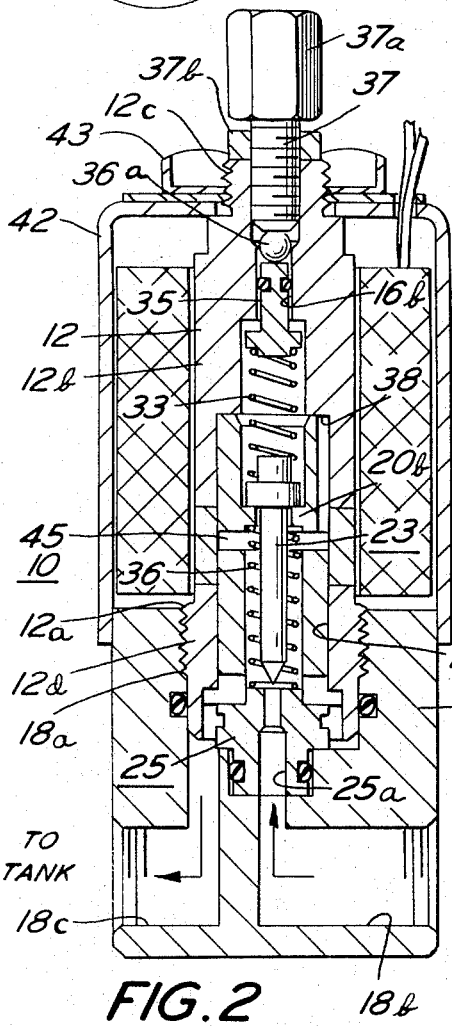
FIG.4
FIG.2
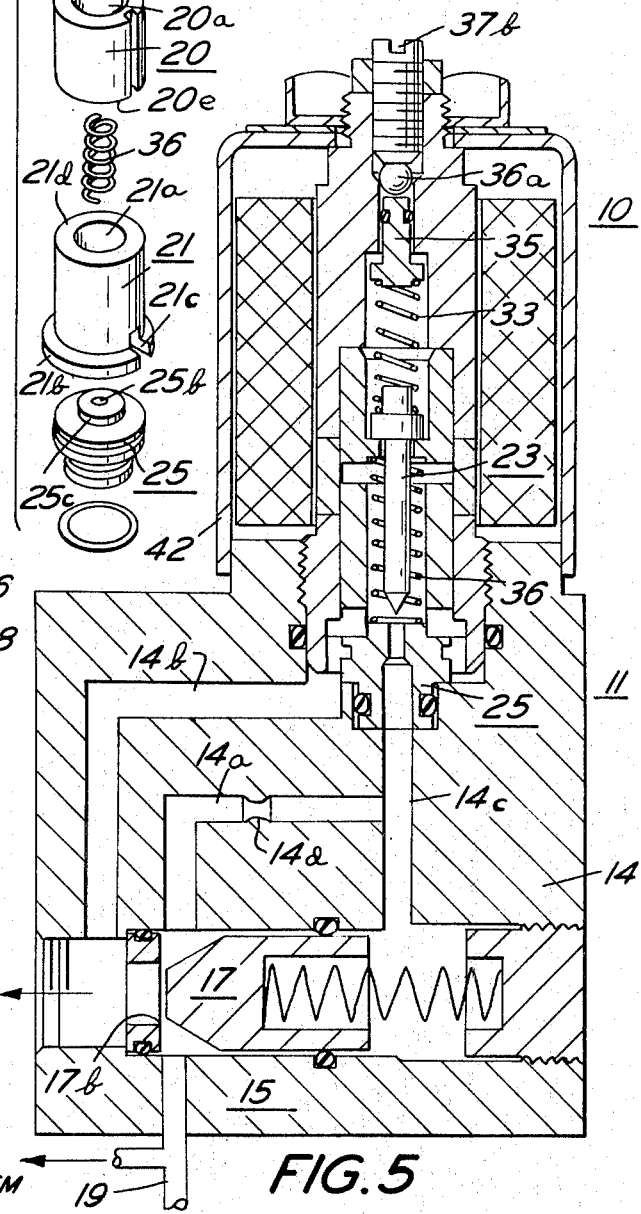
FIG.5

NORMALLY OPEN SOLENOID OPERATED VALVE ASSEMBLY WITH RELIEF FUNCTION

BACKGROUND OF THE INVENTION

1. Field of the Invention

This invention relates to the field of normally open solenoid operated valve assemblies.

2. Prior Art

It has been known in the prior art to use normally open solenoid operated valves in parallel combination with a separate mechanically operated normally closed relief valve. These parallel combinations have had several applications. One example of an application is in unloading a mobile fixed volume pump which is continuously driven by a belt. In this application, when there is no requirement for fluid pressure to be used for work, it becomes necessary to dump the pump to tank. Accordingly, a normally open solenoid valve couples the pump to tank and is only energized to its valve closed state when the fluid is to be used for work. The mechanically operated normally closed relief valve is used in this application for the relief function. However, this parallel combination of a solenoid operated valve and a mechanically operated valve has left much to be desired since the use of two valves in parallel is not only cumbersome but also quite costly.

SUMMARY OF THE INVENTION

A normally open solenoid operated valve assembly which provides a relief function. There is provided plug means movable between a valve normally open position and a position for seating in and closing an orifice and a movable armature has a section for engaging the plug means. A range spring tends to bias the plug means to the valve closed position while a bias spring tends to bias the armature to engage and move the plug means to the valve open position. Since the bias spring has a greater spring force than the range spring, the bias spring normally maintains the plug means in the valve open position.

When the solenoid is energized, an electromagnetic attractive force moves the armature in a direction for allowing the range spring to bias the plug means to the valve closed position. In this manner, when the force of fluid under the plug means is sufficient to overcome the spring force of the range spring then the plug means opens thereby providing the relief function.

BRIEF DESCRIPTION OF THE DRAWINGS

FIG. 1 is a perspective view of a normally open solenoid operated valve assembly of the present invention;

FIG. 2 is a sectional view of the valve assembly of FIG. 1 in a valve open position;

FIG. 3 is a sectional view of a portion of FIG. 2 showing the valve closed position;

FIG. 4 is an exploded view of many of the valve elements in FIGS. 2 and 3; and

FIG. 5 is a sectional view of a valve assembly similar to that of FIGS. 1-4 together with a second stage valve assembly.

DETAILED DESCRIPTION

Referring now to FIGS. 1, 2 and 4, there is shown a single staged normally opened solenoid operated poppet valve assembly 10 having a relief function.

Valve assembly 10 includes a tubular sleeve assembly or housing 12. Assembly 12 comprises a lower sleeve section 12d, a middle sleeve section 12c and an upper sleeve section 12b. Sections 12b and d are made of a very high magnetically permeable material (ferromagnetic). Section 12c is made of a very low magnetically permeable material, such as for example, stainless steel. As shown, section 12b–d are rigidly secured together as for example by welding. Threads 12a are formed on the outer surface of section 12d with the threads engaging internal threads 18a of valve body 18.

Sections 12b–d taken together provide an internal cylindrical chamber 16 for housing a tubular armature 20 and a tubular pole piece 21. At the top of chamber 16 there is formed a reduced inner diameter chamber 16a which terminates in a still further reduced inner diameter chamber 16b both of which are formed in sleeve section 12b remote from sections 12c–d. Armature 20 is slidably received within chamber 16 and has a cylindrical central chamber 20a and a lower reduced inner diameter section 20b. A longitudinal channel 20d is formed in the outer wall of armature 20 to allow fluid flow around the armature. Pole piece 21 has a cylindrical central chamber 21a coaxial with chamber 20a. Pole piece 21 nests in sealed relation within chamber 16 with a lower flange 21b engaging a lip formed in chamber 16. A pair of aligned channels or slots 21c are formed through flange 21b to permit fluid flow between chamber 21a (above poppet 23) and outlet 18e.

The upper portion of armature 20 is within section 12b of chamber 16 while the lower portion thereof is within section 12c. On the other hand, the upper portion of pole piece 21 is within section 12c while the lower and major portion is within section 12d.

Secured between the bottom surface of pole piece 21 and valve body 18 is a control orifice assembly 25 having a central chamber 25a which is in fluid communication with flow channel 14c of valve body 14 as shown. Chamber 25a tapers upwardly to form at its upper end an orifice 25b which provides a seat for a poppet or pilot assembly 23. In order to provide proper alignment, orifice assembly 25 has a reduced diameter shoulder 25c which is received within chamber 21a and is coaxial therewith.

Poppet assembly 23 is adapted to move axially within chambers 20a and 21a. Poppet assembly 23 has a lower portion 23a, an intermediate or guide portion 23b and an upper portion 23c. Lower portion 23a terminates in a valve plug 23d. Guide portion 23b has sidewalls 23e which loosely fit and slide within chamber 20a and provide alignment of the poppet into and out of orifice 25b. The loose fitting between walls 23e and chamber 20a allow passage for the fluid. A lower shoulder 23g of guide 23b is engaged by reduced section 20b with valve assembly 10 in its illustrated normally open position. Section 20b has a somewhat larger inner diameter than the outer diameter of poppet portion 23a to limit contact therebetween and allow for fluid flow.

A range spring 33 is disposed between and engages an upper shoulder of guide 23b and the lower shoulder of an adjusting plunger 35 (latter described in detail). A bias spring 36 is disposed between an upper surface of shoulder 25c and an annular slot formed in lower surface 20e of armature 20. As shown range spring (range resilient means) 33 tends to apply a bias on poppet assembly 23 pushing it towards orifice 25b. On the other hand, bias spring 36 tends to apply a compressive effect or bias on armature 20 and thus to guide 23b in a direction to move the poppet out of the orifice. Since bias spring 36 is selected to have a greater spring force (higher valued spring constant) than that of range spring 33, the bias spring is effective to compress the range spring, as illustrated in the normally open, deenergized state. With valve assembly normally open, the upper surface of armature 20 is stopped by upper wall 38 of chamber 16.

The spring force of range spring 33 may be adjusted by means of the up or down movement of plunger 35. Plunger 35 is received within chamber 16b with the upper end of the plunger engaging a steel ball 36. Ball 36 is held in place by a set screw 37 threadedly received in chamber 16b and secured against rotation by a jamb nut 38. The upper end of screw 37 extends out of chamber 16b and terminates in a head section 37a adapted to be manually rotated by the operator's fingers. Alternatively, screw 37 may have an upper slot 37b as shown in FIG. 5 adapted to be turned by screwdriver. Accordingly, spring 33 may be adjusted in spring force by rotating screw 37 closckwise for increased spring force and counterclockwise for decreased spring force.

A source of magnetic flux is provided by a hollow elongated cylindrically shaped electromagnet 40 which receives in a central opening sleeve assembly 12. A cupshaped cover 42 encloses and protects electromagnet 40 and extends down to valve body 18. Cover 42 has a central opening for receiving therein an upper threaded portion 12e of sleeve section 12b. Cover 42 is secured in place by a nut 43 which threadedly engages the threads of portion 12e. Cover 42 as well as armature 20, pole piece 21, poppet 23 and body 18 are formed of a high magnetically permeable material (ferromagnetic).

The circuit of magnet flux lines produced by electromagnet 40 when energized may be traced as follows. The flux lines flow down through sleeve section 12b, armature 20, and then through air gap 45 (between surfaces 20e and 21d) to pole piece 21. The flow continues through the pole piece, sleeve section 12d, body 18 and then through cover 42 with the circuit being completed to section 12b. As previously described, sleeve section 12c is made of a very low magnetically permeable material and extends substantially above and below air gap 45 so that section 12c provides a gap to the flux circuit greater than that of gap 45. Accordingly, the circuit of flux lines is directed and concentrated through air gap 45.

In operation of valve assembly 10, with electromagnet 40 deenergized, assembly 10 is in its illustrated normally open position (FIG. 2). As previously described, poppet 23 is maintained in its normally open position or state by the force of bias spring 36 pushing against armature 20. It will be understood that valve assembly 10 is a force balance device in which bias spring 36 is only required to be sufficiently greater in spring force than that of range spring 33 to maintain valve assembly 10 in its normally open position.

Upon energization of electromagnet 40, armature 20 is attracted to pole piece 21 thereby compressing bias spring 36. With the bias spring compressed as shown in FIG. 3 range spring 33 is effective to apply a closing force to poppet 23. Thus, poppet valve plug 23d is seated within valve seat orifice 25b for a valve closed state. It will be understood that the spring force of range spring 33 must be greater than the force produced at orifice 25b by the pressure of the fluid in order that the poppet close the orifice and maintain it closed. Thus orifice 25b is maintained closed by the range spring which has an effective spring force sufficient for the relief function. Specifically, if the force of the fluid at inlet 18b and orifice 25b is sufficient to overcome the spring force of range spring 33, then the relief function is provided. If a higher relief pressure is desired or a lower relief pressure is desired, the spring force of spring 33 may be increased or decreased respectively by means of adjusting set screw 37 in the manner previously described.

It will be seen in FIG. 3 that with electromagnet 40 energized and armature 20 contacting pole piece 21, lower shoulder 23g of poppet 23 is no longer resting on reduced section 20b. Accordingly, there is a space between shoulder 23g and section 20b thereby to permit range spring 33 to be 100 percent effective in applying its spring force.

If upstream pump pressure is then applied to inlet 18b and outlet 18c flows to tank then valve assembly 10 operates as a combination solenoid operated valve and relief valve. Thus with valve 10 in its normally open state as shown in FIG. 2, upstream pump pressure is dumped to tank. When there is requirement for fluid pressure to be used for work, electromagnet 40 is energized and valve 10 is closed. If upstream pressure becomes greater than the selected value of relief pressure, then range spring 33 is compressed by upstream pressure thereby providing the relief function.

Referring now to FIG. 5 there is shown a normally open solenoid operated two stage valve assembly 11 which comprises valve assembly 10 as the first stage and a valve assembly 15 as the second stage. Valve assembly 10 is similar to that shown in FIG. 1 and previously described except that valve body 18 has been replaced by a valve body 14 which houses second stage 15. Normally open valve assembly 10 controls second stage 15 to also be normally open, as illustrated.

Valve assembly 15 may be any suitable valve assembly well known in the art comprising a poppet 17 and a substantially light valued spring 17a. In this application, upstream pump pressure is applied by way of a channel 19 under poppet 17. A flow channel 14a provides fluid flow from under poppet 17 through a flow restriction 14d and a flow channel 14c to a chamber above the poppet. In addition, channel 14c is in fluid communication with chamber 25a of orifice assembly 25 of valve 10. In addition, channel 14b provides fluid communication between chamber 21a above poppet plug 23 and tank.

The use of a second stage allows higher valued pressure flow to be applied under poppet 17. By the use of restriction 14d (a pressure divider) the pressure applied by way of channel 14c above poppet 17 and to orifice 25b is an intermediate pressure. Restriction 14d and the areas above and below poppet 17 are selected so that with valve 10 in its closed state, second stage 15 is also in its closed state. In addition with first stage valve 10 in its open state (dumping intermediate pressure to tank) second stage 15 is also in its open state, dumping upstream pump pressure to tank. As well known in the art, this operation may be achieved by the area above poppet 17 being greater than the area under the poppet (differential areas) and with the intermediate pressure being selected to maintain the desired closing force on poppet 17.

In operation, with electromagnet 40 deenergized valve assembly 10 is in its illustrated normally open state which controls second stage 15 to its open state. It will be understood that spring 17 has a low valued spring force so that with valve 10 open, upstream pressure applied by way of channel 19 must still be able to at least overcome that spring force in order to be dumped to tank.

In order to actuate assembly 11 to its closed state, electromagnet 40 is energized and poppet 23 closes orifice 25b. With first stage valve 10 in its closed state, the intermediate pressure at channel 14c is no longer being dumped to tank by way of channel 14b. Accordingly, spring 17a starts poppet 17 in motion to tend to close valve 15. As a result of the differential areas above and below poppet 17, there is an increase in the pressure under the poppet. This pressure increase acts through channel 14a to then increase the intermediate pressure which tends to further push the poppet in a direction to close the valve. This further increases the pressure under the poppet resulting in increased intermediate pressure tending to further close the valve. This operation continues until the valve 15 is actually closed.

It will be understood that with first and second stages 10 and 15 closed that the intermediate pressure in channel 14c and under poppet 23 cannot rise above a desired maximum predetermined value determined by the spring force of range spring 33. Specifically, as the upstream pressure increases the intermediate pressure increases until poppet 23 opens against the intermediate force. Thus poppet 17 allows upstream pressure to flow to tank until that pressure decreases sufficiently.

More particularly the foregoing operation may be more further defined if it is assumed that the upstream pressure is at a value which causes valve 10 to operate at its balance point thereby maintaining the intermediate pressure at channel 14c. At this balance point, valve 10 is continuously leaking in order to maintain the intermediate pressure. If for example a pressure spike is generated upstream, that spike is immediately applied under second stage poppet 17. This pressure spike moves the poppet and opens the second stage orifice. Since flow through restriction 14d is slow, intermediate pressure is always being maintained. Thus the spike is bled off to tank until the balance point of the second stage is again reached and second poppet 17 again closes.

What is claimed is:

1. A normally open solenoid operated valve assembly providing a relief function in which upstream pressure flows into a first flow channel of said valve assembly and out of a second flow channel of said valve assembly comprising an orifice in fluid communication with said first flow channel, plug means movable between a valve normally open position and a position for seating in and closing said orifice, a movable armature having a section for engaging said plug means, range resilient means tending to bias said plug means to said valve closed position, bias resilient means tending to bias said armature to engage and move said plug means to said valve open position, said bias resilient means having greater resilient force than said range resilient means whereby said bias spring means normally maintains said plug means in said valve open position, and solenoid means adapted to be energized for providing an electromagnetic attractive force to move said armature in a direction for allowing said range resilient means to bias said plug means to the valve closed position whereby when the force of fluid in the first flow channel is sufficient to overcome the resilient force of said range resilient means said plug means opens thereby providing said relief function.

2. The valve assembly of claim 1 in which there is provided means for adjusting the resilient force of said range resilient means thereby to vary to a predetermined value the maximum value of the force of the fluid and thus the fluid pressure in said first flow channel.

3. The valve assembly of claim 2 in which said range resilient means is a range spring engaging said plug means and tending to bias said plug means to said valve closed position, and in which said bias resilient means is a bias spring engaging said armature and tending to bias said armature to engage and move said plug means to said valve open position.

4. The valve assembly of claim 3 in which said range spring is in compression between said adjusting means and a surface of said plug means and said bias spring is in compression between a lower surface of said armature and a surface adjacent said orifice, said bias spring having a higher valued spring constant than said range spring thereby providing a force balance system in which said bias spring must only be sufficiently greater in spring force than that of said range spring to maintain said valve assembly in its normally open position.

5. The valve assembly of claim 4 in which said adjusting means comprises a plunger for engaging said range spring and screw adjustment means for raising or lowering said plunger with said screw adjusting means being accessible for turning from exterior of said valve assembly.

6. The valve assembly of claim 5 in which said plug means includes a guide portion and in which said armature comprises a chamber having a reduced diameter section for engaging said guide portion of said plug means.

7. The valve assembly of claim 6 in which there is provided pole piece means fixedly disposed between said armature and said orifice and having a chamber for receiving the entire lower portion of said plug means and a major portion of said bias spring and having an upper surface forming an air gap with said armature, said attractive force being produced between said upper surface and said armature for moving said armature to further compress said bias spring.

8. The valve assembly of claim 2 in which there is provided a second stage valve assembly having a second stage poppet and orifice, said first flow channel in fluid communication above said poppet, upstream pressure applied by way of a third flow channel (1) below said poppet and (2) through a flow restriction to said first flow channel, said second flow channel and said second stage orifice leading to tank whereby said second stage poppet is controlled to be in its normally open position when said plug means is in said normally open position.

9. The valve assembly of claim 8 in which said third flow channel leads to a system requiring fluid pressure whereby with said second valve assembly normally open said upstream pressure is dumped to tank and in the closed position said second poppet closes said second orifice so that said upstream pressure is maintained at a maximum predetermined value.

* * * * *